US012120543B2

(12) United States Patent
Yiu et al.

(10) Patent No.: US 12,120,543 B2
(45) Date of Patent: Oct. 15, 2024

(54) TECHNIQUES IN MULTIPLE MEASUREMENT GAPS IN NEW RADIO (NR)

(71) Applicant: Apple Inc., Cupertino, CA (US)

(72) Inventors: Candy Yiu, Portland, OR (US); Jie Cui, Santa Clara, CA (US); Yang Tang, San Jose, CA (US)

(73) Assignee: Apple Inc., Cupertino, CA (US)

( * ) Notice: Subject to any disclaimer, the term of this patent is extended or adjusted under 35 U.S.C. 154(b) by 567 days.

(21) Appl. No.: 17/276,343

(22) PCT Filed: Sep. 16, 2019

(86) PCT No.: PCT/US2019/051365
§ 371 (c)(1),
(2) Date: Mar. 15, 2021

(87) PCT Pub. No.: WO2020/060951
PCT Pub. Date: Mar. 26, 2020

(65) Prior Publication Data
US 2022/0046454 A1    Feb. 10, 2022

(51) Int. Cl.
*H04W 36/00* (2009.01)
*H04W 4/00* (2018.01)
(Continued)

(52) U.S. Cl.
CPC ............ *H04W 24/10* (2013.01); *H04W 8/24* (2013.01)

(58) Field of Classification Search
CPC ... H04W 24/10; H04W 36/0058; H04W 8/24; H04W 36/14; H04W 72/048;
(Continued)

(56) References Cited

U.S. PATENT DOCUMENTS 9,674,740 B2 *  6/2017  Masini ............ H04W 36/00835
10,390,250 B2 *  8/2019  Yang ................... H04W 72/542
(Continued)

FOREIGN PATENT DOCUMENTS

CN    107409027 A    11/2017
CN    107637120 A    1/2018
WO    2018089917 A1    5/2018

OTHER PUBLICATIONS

Ericsson, "Signalling of Measurement Gaps for Interruption Control", R2-166954, 3GPP TSG-RAN WG2 #95bis Kaohsiung, Taiwan, Oct. 10-14, 2016 (Year: 2016).*
(Continued)

*Primary Examiner* — Edan Orgad
*Assistant Examiner* — Vanneilian Lalchinthang
(74) *Attorney, Agent, or Firm* — Sterne, Kessler, Goldstein & Fox P.L.L.C.

(57) ABSTRACT

Embodiments of the present disclosure describe methods, apparatuses, storage media, and systems for multiple measurement gaps (MGs) configurations with user equipment (UE) capability of supporting the multiple MGs in New Radio (NR) involved networks. Various embodiments describe how to communicate a UE capability of supporting multiple MGs between the UE and an access node (AN) so that multiple MGs may be configured to the UE effectively and efficiently. Other embodiments may be described and claimed.

20 Claims, 8 Drawing Sheets

(51) Int. Cl.
*H04W 8/24* (2009.01)
*H04W 24/10* (2009.01)
*H04W 72/04* (2023.01)

(58) Field of Classification Search
CPC ......... H04W 36/0088; H04W 72/0446; H04W 24/00; H04W 8/22; H04W 72/51; H04W 36/0085; H04W 36/142; H04W 92/10; H04L 5/00; H04L 5/001; H04L 5/003; H04L 1/00
USPC .......................................................... 370/252
See application file for complete search history.

(56) References Cited

U.S. PATENT DOCUMENTS

| | | | |
|---|---|---|---|
| 11,223,981 B2* | 1/2022 | Wu | H04W 36/0058 |
| 11,418,941 B2* | 8/2022 | Tsuboi | H04W 8/08 |
| 2012/0113866 A1 | 5/2012 | Tenny et al. | |
| 2014/0200002 A1* | 7/2014 | Vangala | H04W 36/32 455/436 |
| 2014/0341192 A1* | 11/2014 | Venkob | H04W 52/0216 370/336 |
| 2018/0006774 A1 | 1/2018 | Yiu et al. | |
| 2018/0034598 A1 | 2/2018 | Yiu et al. | |
| 2018/0084448 A1 | 3/2018 | Yang et al. | |
| 2019/0021017 A1* | 1/2019 | Nagaraja | H04W 72/51 |
| 2019/0342801 A1* | 11/2019 | Cui | H04W 72/23 |
| 2019/0380128 A1* | 12/2019 | Park | H04W 88/10 |
| 2020/0100132 A1* | 3/2020 | Liu | H04W 76/15 |
| 2021/0014752 A1* | 1/2021 | Axmon | H04W 36/0088 |
| 2021/0029566 A1* | 1/2021 | Li | H04W 24/08 |

OTHER PUBLICATIONS

Interational Search Report and Written Opinion of the International Search Authority directed to related International Patent Application No. PCT/US2019/051365, mailed Jan. 3, 2020; 11 pages.

Samsung, "Measurement Gap Configuration for EN-DC," R2-1800625, 3GPP TSG RAN WG2 #NR AdHoc, Vancouver, Canada, Jan. 11, 2018.

Intel Corporation, "Measurement gap capability information for NR SA," R2-1802978, 3GPP TSG RAN WG2 #101, Athens, Greece, Feb. 16, 2018.

Ericsson, "Clarification of UE measurement mode," R4-1802092, 3GPP TSG RAN WG4 #86, Athens, Greece, Feb. 19, 2018.

ZTE Corporation et al., "Inclusion of measurement gap related agreements," R2-1813234, 3GPP TSG RAN WG2 #103, Gothenburg, Sweden, Aug. 26, 2018.

Intel Corporation, "Updated L2 capabilities," R2-1813440, 3GPP TSG RAN WG2 #103, Gothenburg, Sweden, Sep. 3, 2018.

First Chinese Office Action directed to related Chinese Application No. 201980060517.0, with English-language machine translation attached, mailed Mar. 9, 2014; 28 pages.

* cited by examiner

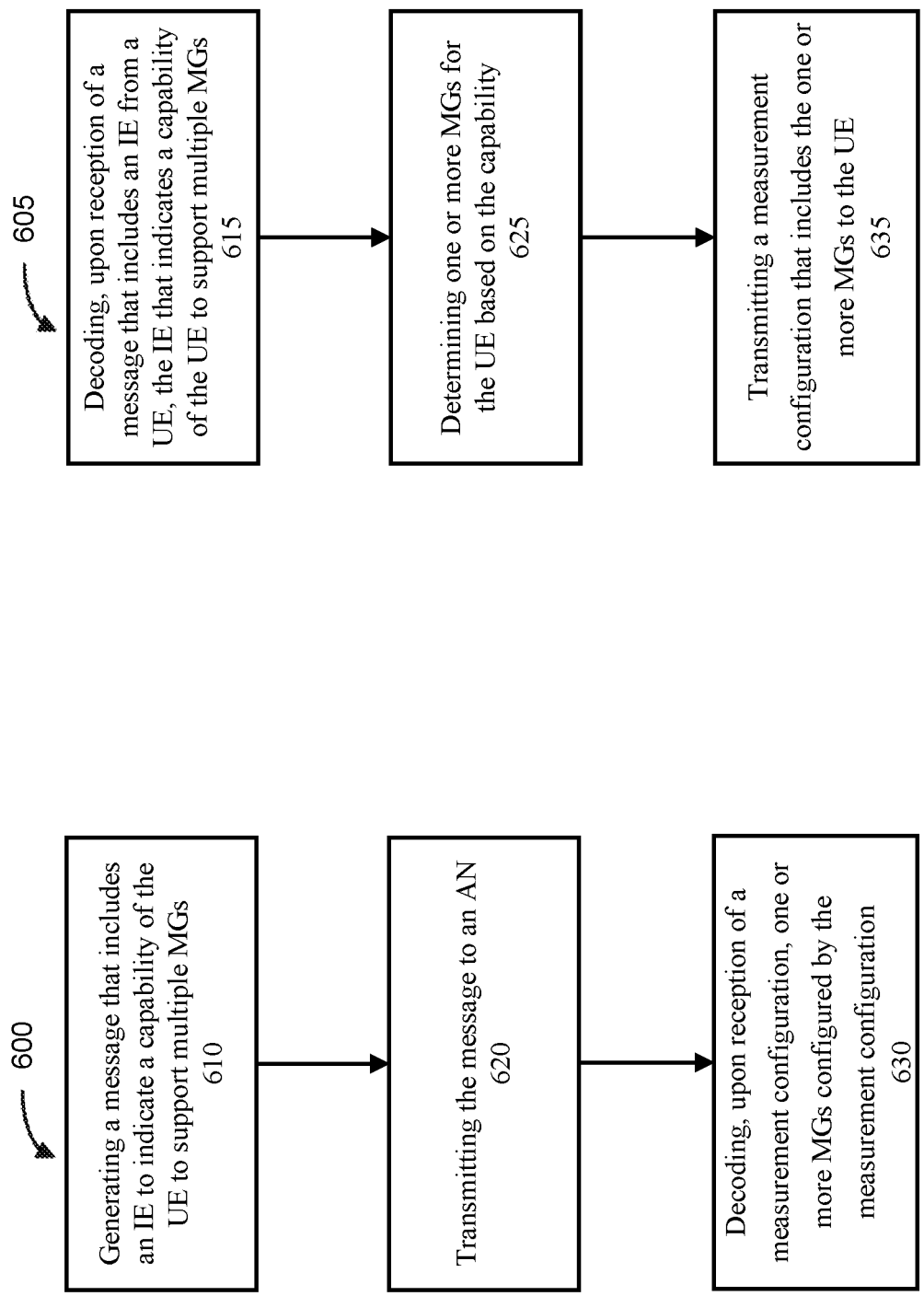

TECHNIQUES IN MULTIPLE MEASUREMENT GAPS IN NEW RADIO (NR)

CROSS REFERENCE TO RELATED APPLICATION

The present application is a National Stage entry from PCT/US2019/051365 filed on Sep. 16, 2019, entitled "Techniques in Multiple Measurement Gaps in New Radio (NR)", which claims priority to U.S. Provisional Patent Application No. 62/732,473, filed Sep. 17, 2018, entitled "UE Capability for Multiple Measurement Gap" both of which are incorporated herein by reference in their entireties.

FIELD

Embodiments of the present invention relate generally to the technical field of wireless communications.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure. Unless otherwise indicated herein, the approaches described in this section are not prior art to the claims in the present disclosure and are not admitted to be prior art by inclusion in this section.

Various Fifth Generation (5G) New Radio (NR) involved communications and/or networks have been developed in broad frequency ranges, such as sub-6 GHz and millimeter wave (mmWave). In accordance, more than one measurement gap (MG) type have been defined and used, such as per user equipment (UE) gap, per frequency range (FR) gap, etc. Meanwhile, a UE may only be using one MG type at a time, which may affect radio resource management (RRM) efficiency with respect to either the UE or the network. New solutions are needed in this regard.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

FIG. 6A illustrates an operation flow/algorithmic structure to facilitate a process of MG configuration with respect to UE capability of supporting multiple MGs by the UE in NR involved networks, in accordance with various embodiments. FIG. 6B illustrates an operation flow/algorithmic structure to facilitate the process of MG configuration with respect to UE capability of supporting multiple MGs by the AN in the NR involved networks, in accordance with various embodiments.

DETAILED DESCRIPTION

Figure 1:
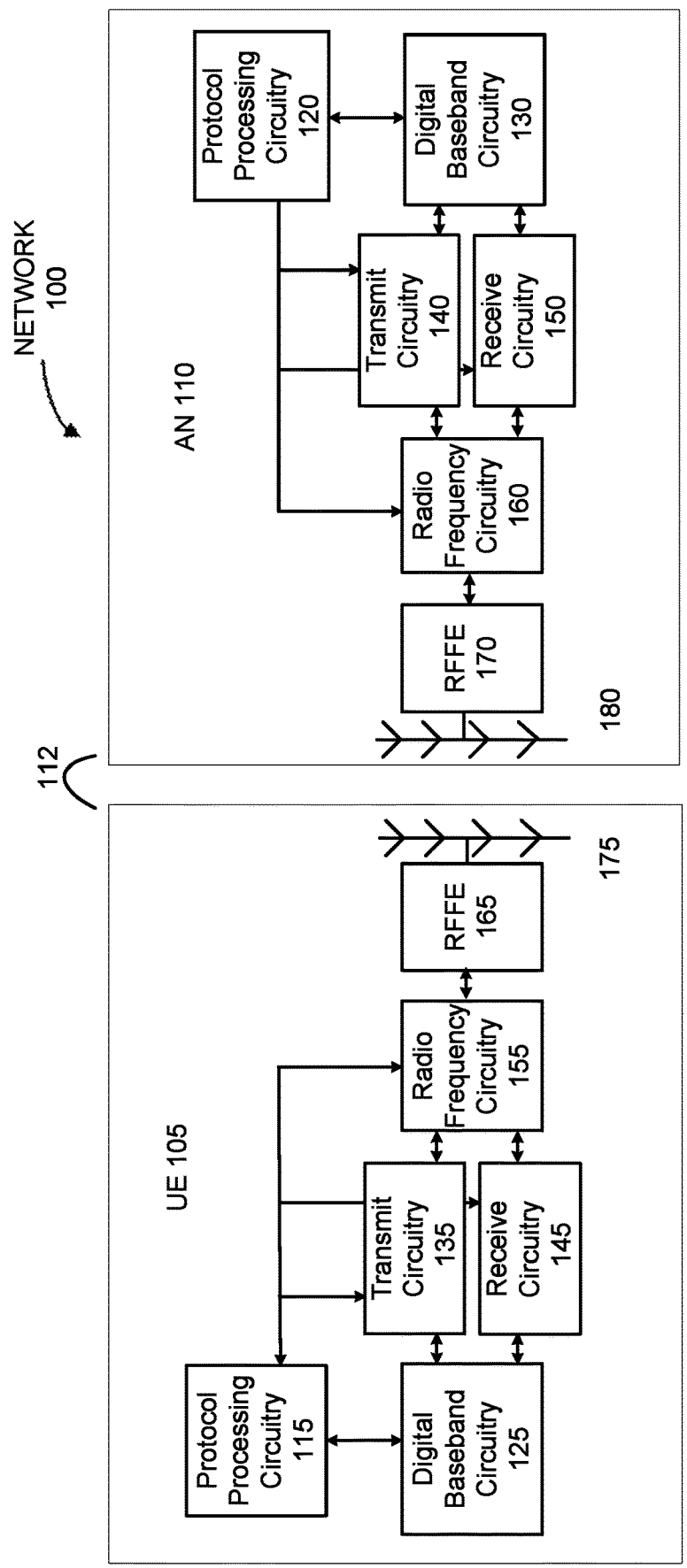
FIG. 1 schematically illustrates an example of a network comprising a user equipment (UE) and an access node (AN) in a wireless network, in accordance with various embodiments.

In the following detailed description, reference is made to the accompanying drawings that form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrases "A or B" and "A and/or B" mean (A), (B), or (A and B). For the purposes of the present disclosure, the phrases "A, B, or C" and "A, B, and/or C" mean (A), (B), (C), (A and B), (A and C), (B and C), or (A, B, and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "circuitry" may refer to, be part of, or include any combination of integrated circuits (for example, a field-programmable gate array (FPGA), an application specific integrated circuit (ASIC), etc.), discrete circuits, combinational logic circuits, system on a chip (SOC), system in a package (SiP), that provides the described functionality. In some embodiments, the circuitry may execute one or more software or firmware modules to provide the described functions. In some embodiments, circuitry may include logic, at least partially operable in hardware.

There are various bands below 6 GHz in 4G LTE networks. In NR, frequency range 1 (FR1) overlaps and extends 4G LTE frequencies, including various bands from 450 MHz to 6,000 MHz, which is commonly referred to as NR sub-6 GHz. NR further includes a frequency range 2 (FR2) covering from 24,250 MHz to 52,600 MHz, which is commonly referred to as mmWave, even though the millimeter wave frequency may start at 30 GHz strictly speaking. Herein, the pairs of FR1/FR2 and sub-6 GHz (below 6 GHz)/mmWave are used interchangeably.

Multi-Radio Access Technology (RAT) Dual Connectivity (MR-DC) may involve a multiple reception (Rx)/transmission (Tx) UE that may be configured to utilize radio resources provided by two distinct schedulers in two different nodes connected via non-ideal backhaul, one providing Evolved Universal Terrestrial Radio Access (E-UTRA) access and the other one providing NR access. One scheduler is located in a Master Node (MN) and the other in the Secondary Node (SN). The MN and SN are connected via a network interface and at least the MN is connected to the core network.

MR-DC may include E-UTRA-NR Dual Connectivity (EN-DC) or NG-RAN E-UTRA-NR Dual Connectivity (NGEN-DC). In EN-DC communications, a UE may be connected to one evolved NodeB (eNB) that acts as an MN and one en-next generation NodeB (gNB) that acts as an SN. The eNB is connected to an evolved packet core (EPC) and the en-gNB is connected to the eNB. The en-gNB may be a node that provides new radio (NR) user-plane and control-plane protocol terminations towards the UE, and acts as the SN in EN-DC.

A measurement gap configuration schedules a gap period repeatedly so that a UE may use the configured period to conduct a non-data duty, for example, cell measurements. A UE may use measurement gaps to identify and measure intra-frequency cells, intra-frequency cells, and/or inter-RAT E-UTRAN cells. The term "measurement" herein refers to one or more measurements involving non-data duty between the UE and network. The measurement may be performed with respect to one or more synchronization signals (SSs) that include one or more SS blocks (SSBs). A UE may use measurement gaps to identify and measure intra-frequency cells, intra-frequency cells, and/or inter-RAT E-UTRAN cells. During a configured MG period, the UE may not be expected to transmit or receive data with serving cell, or like activities.

An MG configuration may correspond to one or more MG patterns on which the UE's operations may be based. The operations may include identifying and measuring cells in the network, and other non-data operations. A UE may be configured with an MG while operating at any frequency in either FR1 or FR2. Such a measurement gap configuration may be referred to as a UE gap or a per UE gap.

Note that terms "measurement gap (MG)" and "gap" are used interchangeably throughout this disclosure, and terms "UE gap," "per-UE gap," "UE MG," "per-UE MG" are used interchangeably throughout this disclosure.

In some situations, a UE may be configured with more than one measurement gap according to different frequencies at which the UE may operate. For example, a UE may comply with respective measurement gaps while operating at FR1 and FR2 to accommodate different operations at different frequency ranges. However, the UE may activate or use one MG and/or MG pattern at any given time. This may affect UE and/or network data processing efficiency. A detailed example is to be illustrated with respect to FIG. 3. Thus, it may improve UE and/or network efficiency if the UE can indicate its capability of supporting multiple MGs and the network can configure one or more MGs accordingly.

Note that terms "FR1 gap," "per-FR1 gap," "FR1 MG," "per-FR1 MG" are used interchangeably throughout this disclosure, and terms "FR2 gap," "per-FR2 gap," "FR2 MG," "per-FR2 MG" are used interchangeably throughout this disclosure. FR1 gap and FR2 gap may be collectively referred to as FR gap.

Embodiments described herein may include, for example, apparatuses, methods, and storage media for configuring and implementing one or more measurement gaps with UE capability information in an NR involved network. The implementation may improve UE and/or network efficiency and allow the UE to measure more than one object with adequate MG(s).

FIG. 1 schematically illustrates an example wireless network 100 (hereinafter "network 100") in accordance with various embodiments herein. The network 100 may include a UE 105 in wireless communication with an AN 110. In some embodiments, the network 100 may be a NR SA network. The UE 105 may be configured to connect, for example, to be communicatively coupled, with the AN 110. In this example, the connection 112 is illustrated as an air interface to enable communicative coupling, and can be consistent with cellular communications protocols such as a 5G NR protocol operating at mmWave and sub-6 GHz, a Global System for Mobile Communications (GSM) protocol, a code-division multiple access (CDMA) network protocol, a Push-to-Talk (PTT) protocol, and the like.

The UE 105 is illustrated as a smartphone (for example, a handheld touchscreen mobile computing device connectable to one or more cellular networks), but may also comprise any mobile or non-mobile computing devices, such as a Personal Data Assistant (PDA), pager, laptop computer, desktop computer, wireless handset, customer premises equipment (CPE), fixed wireless access (FWA) device, vehicle mounted UE or any computing device including a wireless communications interface. In some embodiments, the UE 105 can comprise an Internet of Things (IoT) UE, which can comprise a network access layer designed for low-power IoT applications utilizing short-lived UE connections. An IoT UE can utilize technologies such as narrowband IoT (NB-IoT), machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An NB-IoT/MTC network describes interconnecting NB-IoT/MTC UEs, which may include uniquely identifiable embedded computing devices (within the Internet infrastructure), with short-lived connections. The NB-IoT/MTC UEs may execute background applications (for example, keep-alive message, status updates, location related services, etc.).

The AN 110 can enable or terminate the connection 112. The AN 110 can be referred to as a base station (BS), NodeB, evolved-NodeB (eNB), Next-Generation NodeB (gNB or ng-gNB), NG-RAN node, cell, serving cell, neighbor cell, and so forth, and can comprise ground stations (for example, terrestrial access points) or satellite stations providing coverage within a geographic area.

The AN 110 can be the first point of contact for the UE 105. In some embodiments, the AN 110 can fulfill various logical functions including, but not limited to, radio network controller (RNC) functions such as radio bearer management, uplink and downlink dynamic radio resource management and data packet scheduling, and mobility management.

In some embodiments, a downlink resource grid can be used for downlink transmissions from the AN 110 to the UE 105, while uplink transmissions can utilize similar techniques. The grid can be a time-frequency grid, called a resource grid or time-frequency resource grid, which is the physical resource in the downlink in each slot. Such a time-frequency plane representation is a common practice for orthogonal frequency division multiplexing (OFDM) systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UE 105. The physical downlink control channel (PDCCH) may carry information about the transport format and resource allocations related to the PDSCH channel, among other things. It may also inform the UE 105 about the transport format, resource allocation, and hybrid automatic repeat request (HARQ) information related to the uplink shared channel. Typically, downlink scheduling (assigning control and shared channel resource blocks to the UE 105 within a cell) may be performed at the AN 110 based on channel quality information fed back from any of the UE 105. The downlink resource assignment information may be sent on the PDCCH used for (for example, assigned to) the UE 105.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition.

Some embodiments may use concepts for resource allocation for control channel information that are an extension of the above-described concepts. For example, some embodiments may utilize an enhanced physical downlink control channel (ePDCCH) that uses PDSCH resources for control information transmission. The ePDCCH may be transmitted using one or more enhanced control channel elements (ECCEs). Similar to the above, each ECCE may correspond to nine sets of four physical resource elements known as enhanced resource element groups (EREGs). An ECCE may have other numbers of EREGs in some situations.

As shown in FIG. 1, the UE 105 may include millimeter wave communication circuitry grouped according to functions. The circuitry shown here is for illustrative purposes and the UE 105 may include other circuitry shown in FIG. 3. The UE 105 may include protocol processing circuitry 115, which may implement one or more of layer operations related to medium access control (MAC), radio link control (RLC), packet data convergence protocol (PDCP), radio resource control (RRC) and non-access stratum (NAS). The protocol processing circuitry 115 may include one or more processing cores (not shown) to execute instructions and one or more memory structures (not shown) to store program and data information.

The UE 105 may further include digital baseband circuitry 125, which may implement physical layer (PHY) functions including one or more of HARQ functions, scrambling and/or descrambling, coding and/or decoding, layer mapping and/or de-mapping, modulation symbol mapping, received symbol and/or bit metric determination, multi-antenna port pre-coding and/or decoding, which may include one or more of space-time, space-frequency or spatial coding, reference signal generation and/or detection, preamble sequence generation and/or decoding, synchronization sequence generation and/or detection, control channel signal blind decoding, and other related functions.

The UE 105 may further include transmit circuitry 135, receive circuitry 145, radio frequency (RF) circuitry 155, and RF front end (RFFE) 165, which may include or connect to one or more antenna panels 175.

In some embodiments, RF circuitry 155 may include multiple parallel RF chains or branches for one or more of transmit or receive functions; each chain or branch may be coupled with one antenna panel 175.

In some embodiments, the protocol processing circuitry 115 may include one or more instances of control circuitry (not shown) to provide control functions for the digital baseband circuitry 125 (or simply, "baseband circuitry 125"), transmit circuitry 135, receive circuitry 145, radio frequency circuitry 155, RFFE 165, and one or more antenna panels 175.

Figure 2:
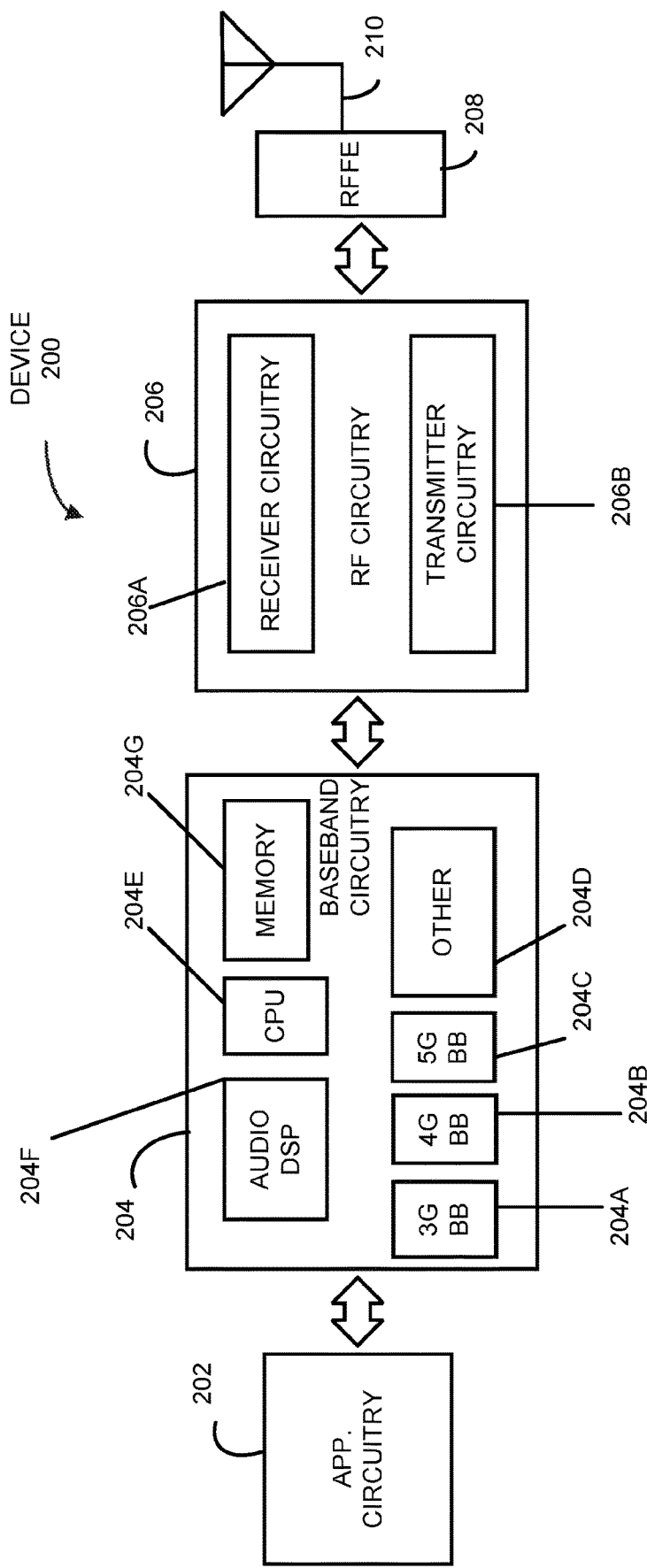
FIG. 2 illustrates example components of a device in accordance with various embodiments.

A UE reception may be established by and via the one or more antenna panels 175, RFFE 165, RF circuitry 155, receive circuitry 145, digital baseband circuitry 125, and protocol processing circuitry 115. The one or more antenna panels 175 may receive a transmission from the AN 110 by receive-beamforming signals received by a plurality of antennas/antenna elements of the one or more antenna panels 175. Further details regarding the UE 105 architecture are illustrated in FIGS. 2, 3, and 6. The transmission from the AN 110 may be transmit-beamformed by antennas of the AN 110. In some embodiments, the baseband circuitry 125 may contain both the transmit circuitry 135 and the receive circuitry 145. In other embodiments, the baseband circuitry 125 may be implemented in separate chips or modules, for example, one chip including the transmit circuitry 135 and another chip including the receive circuitry 145.

Similar to the UE 105, the AN 110 may include mmWave/sub-mmWave communication circuitry grouped according to functions. The AN 110 may include protocol processing circuitry 120, digital baseband circuitry 130 (or simply, "baseband circuitry 130"), transmit circuitry 140, receive circuitry 150, RF circuitry 160, RFFE 170, and one or more antenna panels 180.

A cell transmission may be established by and via the protocol processing circuitry 120, digital baseband circuitry 130, transmit circuitry 140, RF circuitry 160, RFFE 170, and one or more antenna panels 180. The one or more antenna panels 180 may transmit a signal by forming a transmit beam. FIG. 3 further illustrates details regarding the RFFE 170 and antenna panel 180.

FIG. 2 illustrates example components of a device 200 in accordance with some embodiments. In contrast to FIG. 1, FIG. 2 illustrates example components of the UE 105 or the AN 110 from a receiving and/or transmitting function point of view, and it may not include all of the components described in FIG. 1. In some embodiments, the device 200 may include application circuitry 202, baseband circuitry 204, RF circuitry 206, RFFE circuitry 208, and a plurality of antennas 210 together at least as shown. The baseband circuitry 204 may be similar to and substantially interchangeable with the baseband circuitry 125 in some embodiments. The plurality of antennas 210 may constitute one or more antenna panels for beamforming. The components of the illustrated device 200 may be included in a UE or an AN. In some embodiments, the device 200 may include fewer elements (for example, a cell may not utilize the application circuitry 202, and instead include a processor/controller to process IP data received from an EPC). In some embodiments, the device 200 may include additional elements such as, for example, a memory/storage, display, camera, sensor, or input/output (I/O) interface. In other embodiments, the components described below may be included in more than one device (for example, said circuitry may be separately included in more than one device for Cloud-RAN (C-RAN) implementations).

The application circuitry 202 may include one or more application processors. For example, the application circuitry 202 may include circuitry such as, but not limited to, one or more single-core or multi-core processors. The processor(s) may include any combination of general-purpose processors and dedicated processors (for example, graphics processors, application processors, etc.). The processors may be coupled with or may include memory/storage and may be configured to execute instructions stored in the memory/storage to enable various applications or operating systems to run on the device 200. In some embodiments, processors of application circuitry 202 may process IP data packets received from an EPC.

The baseband circuitry 204 may include circuitry such as, but not limited to, one or more single-core or multi-core processors. The baseband circuitry 204 may be similar to and substantially interchangeable with the baseband circuitry 125 and the baseband circuitry 130 in some embodiments. The baseband circuitry 204 may include one or more baseband processors or control logic to process baseband signals received from a receive signal path of the RF circuitry 206 and to generate baseband signals for a transmit signal path of the RF circuitry 206. Baseband circuitry 204 may interface with the application circuitry 202 for generation and processing of the baseband signals and for controlling operations of the RF circuitry 206. For example, in some embodiments, the baseband circuitry 204 may include a third generation (3G) baseband processor 204A, a fourth generation (4G) baseband processor 204B, a fifth generation (5G) baseband processor 204C, or other baseband processor(s) 204D for other existing generations, generations in development or to be developed in the future (for example, second generation (2G), sixth generation (6G), etc.). The baseband circuitry 204 (for example, one or more of baseband processors 204A-D) may handle various radio control functions that enable communication with one or more radio networks via the RF circuitry 206. In other embodiments, some or all of the functionality of baseband processors 204A-D may be included in modules stored in the memory 204G and executed via a central processing unit (CPU) 204E. The radio control functions may include, but are not limited to, signal modulation/demodulation, encoding/decoding, radio frequency shifting, etc. In some embodiments, modulation/demodulation circuitry of the baseband circuitry 204 may include Fast-Fourier Transform (FFT), precoding, or constellation mapping/demapping functionality. In some embodiments, encoding/decoding circuitry of the baseband circuitry 204 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 204 may include one or more audio digital signal processor(s) (DSP) 204F. The audio DSP(s) 204F may include elements for compression/decompression and echo cancellation and may include other suitable processing elements in other embodiments. Components of the baseband circuitry may be suitably combined in a single chip, in a single chipset, or disposed on a same circuit board in some embodiments. In some embodiments, some or all of the constituent components of the baseband circuitry 204 and the application circuitry 202 may be implemented together such as, for example, on a SOC.

In some embodiments, the baseband circuitry 204 may provide for communication compatible with one or more radio technologies. For example, in some embodiments, the baseband circuitry 204 may support communication with an evolved universal terrestrial radio access network (E-UTRAN) or other wireless metropolitan area networks (WMAN), a wireless local area network (WLAN), a wireless personal area network (WPAN). Embodiments in which the baseband circuitry 204 is configured to support radio communications of more than one wireless protocol may be referred to as multi-mode baseband circuitry.

RF circuitry 206 may enable communication with wireless networks using modulated electromagnetic radiation through a non-solid medium. In various embodiments, the RF circuitry 206 may include one or more switches, filters, amplifiers, etc. to facilitate the communication with the wireless network. RF circuitry 206 may include receiver circuitry 206A, which may include circuitry to down-convert RF signals received from the RFFE circuitry 208 and provide baseband signals to the baseband circuitry 204. RF circuitry 206 may also include transmitter circuitry 206B, which may include circuitry to up-convert baseband signals provided by the baseband circuitry 204 and provide RF output signals to the RFFE circuitry 208 for transmission.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 206 may include analog-to-digital converter (ADC) and digital-to-analog converter (DAC) circuitry and the baseband circuitry 204 may include a digital baseband interface to communicate with the RF circuitry 206.

In some dual-mode embodiments, a separate radio integrated circuit (IC) circuitry may be provided for processing signals for each spectrum, although the scope of the embodiments is not limited in this respect.

RFFE circuitry 208 may include a receive signal path, which may include circuitry configured to operate on RF beams received from one or more antennas 210. The RF beams may be transmit beams formed and transmitted by the AN 110 while operating in mmWave or sub-mmWave frequency rang. The RFFE circuitry 208 coupled with the one or more antennas 210 may receive the transmit beams and proceed them to the RF circuitry 206 for further processing. RFFE circuitry 208 may also include a transmit signal path, which may include circuitry configured to amplify signals for transmission provided by the RF circuitry 206 for transmission by one or more of the antennas 210, with or without beamforming. In various embodiments, the amplification through transmit or receive signal paths may be done solely in the RF circuitry 206, solely in the RFFE circuitry 208, or in both the RF circuitry 206 and the RFFE circuitry 208.

In some embodiments, the RFFE circuitry 208 may include a TX/RX switch to switch between transmit mode and receive mode operation. The RFFE circuitry 208 may include a receive signal path and a transmit signal path. The receive signal path of the RFFE circuitry 208 may include a low noise amplifier (LNA) to amplify received RF beams and provide the amplified received RF signals as an output (for example, to the RF circuitry 206). The transmit signal path of the RFFE circuitry 208 may include a power amplifier (PA) to amplify input RF signals (for example, provided by RF circuitry 206), and one or more filters to generate RF signals for beamforming and subsequent transmission (for example, by one or more of the one or more antennas 210).

Processors of the application circuitry 202 and processors of the baseband circuitry 204 may be used to execute elements of one or more instances of a protocol stack. For example, processors of the baseband circuitry 204, alone or in combination, may be used to execute Layer 3, Layer 2, or Layer 1 functionality, while processors of the application circuitry 202 may utilize data (for example, packet data) received from these layers and further execute Layer 4 functionality (for example, transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/AN, described in further detail below.

Figure 3B:
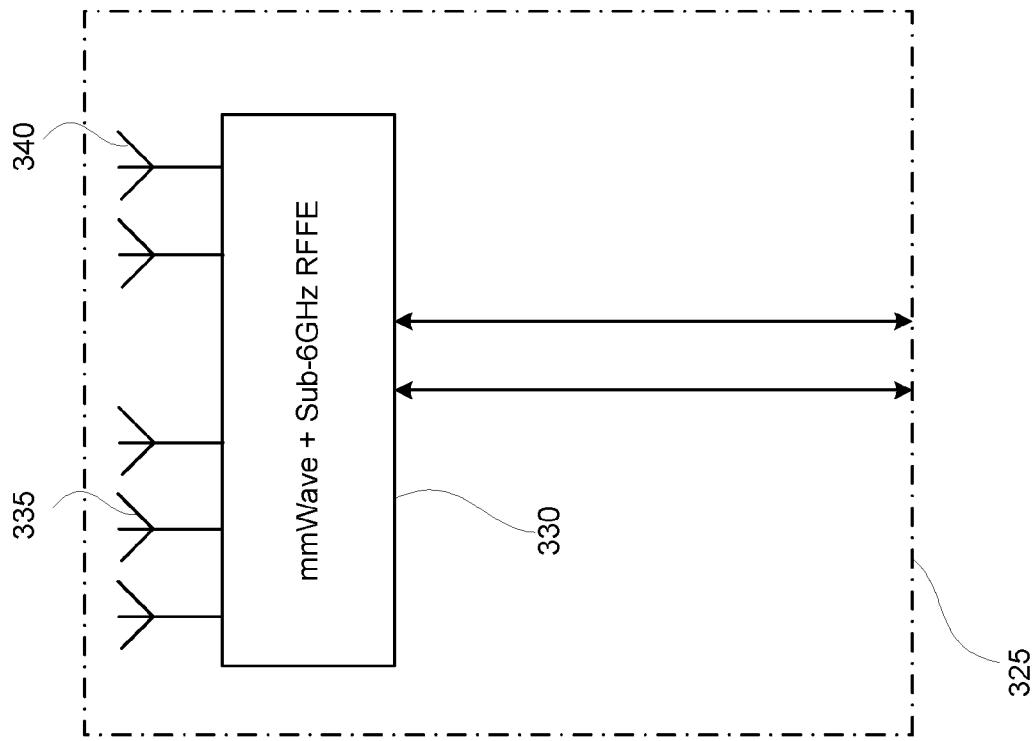
FIG. 3B illustrates an alternative RFFE in accordance with various embodiments.
Figure 3A:
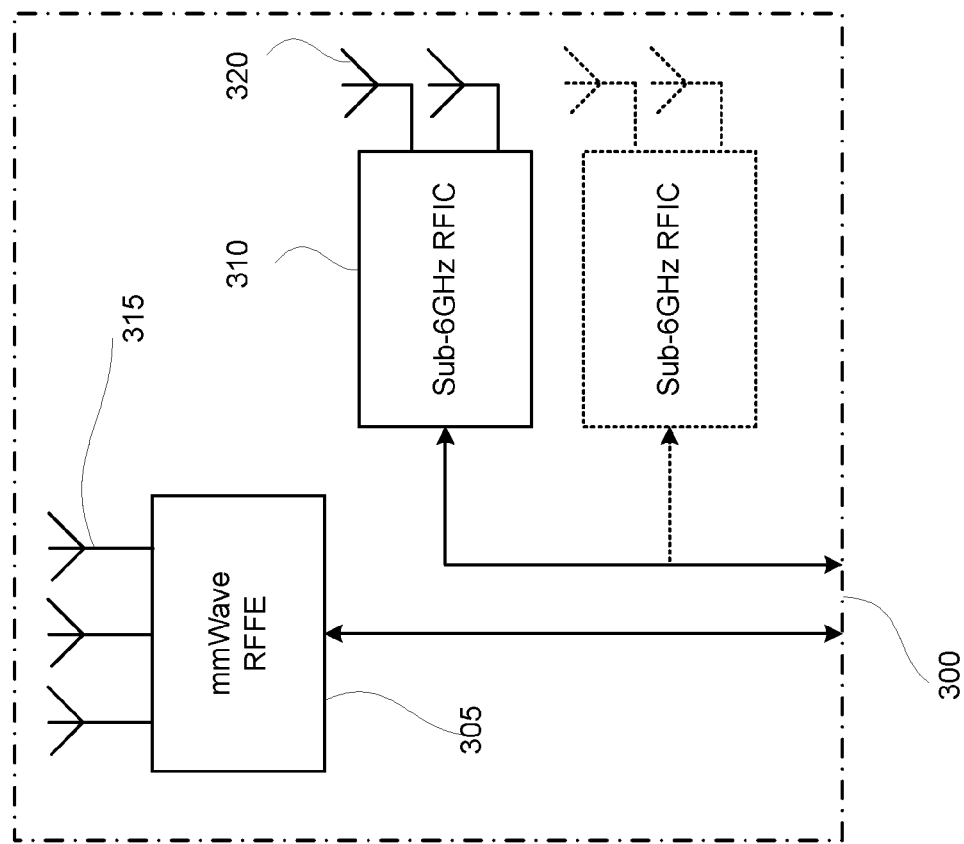
FIG. 3A illustrates an example radio frequency front end (RFFE) incorporating a millimeter Wave (mmWave) RFFE and one or more sub-millimeter wave radio frequency integrated circuits (RFICs) in accordance with some embodiments.

FIG. 3A illustrates an embodiment of a radio frequency front end 300 incorporating an mmWave RFFE 305 and one or more sub-6 GHz radio frequency integrated circuits (RFICs) 310. The mmWave RFFE 305 may be similar to and substantially interchangeable with the RFFE 165, RFFE 170, and/or the RFFE circuitry 208 in some embodiments. The mmWave RFFE 305 may be used for the UE 105 while operating in FR2 or mmWave; the RFICs 310 may be used for the UE 105 while operating in FR1, sub-6 GHz, or LTE bands. In this embodiment, the one or more RFICs 310 may be physically separated from the mmWave RFFE 305. RFICs 310 may include connection to one or more antennas 320. The RFFE 305 may be coupled with multiple antennas 315, which may constitute one or more antenna panels.

FIG. 3B illustrates an alternate embodiment of an RFFE 325. In this aspect both millimeter wave and sub-6 GHz radio functions may be implemented in the same physical RFFE 330. The RFFE 330 may incorporate both millimeter wave antennas 335 and sub-6 GHz antennas 340. The RFFE 330 may be similar to and substantially interchangeable with the RFFE 165, RFFE 170, and/or the RFFE circuitry 208 in some embodiments.

FIGS. 3A and 3B illustrate embodiments of various RFFE architectures for either the UE 105 or the AN 110.

In a cellular network, it may be desirable to measure cell quality, such as reference signal received power (RSRP), reference signal received quality (RSRQ), signal to noise and interference ratio (SINR), and/or other like quality measurements, for handover to a neighbor cell and/or adding a new carrier component (CC) in a carrier aggregation (CA). With LTE, a cell-specific reference signal (CRS) may be transmitted continuously so that the UE may measure the cell quality of a neighbor cell. By contrast, NR does not have reference signal CRS, which may reduce resource overhead and interference to other cells. With NR, synchronization signal/physical broadcast channel (PBCH) blocks (SSBs) may be used for cell quality measurements. The SSBs may have a longer transmission periodicity than CRS. The SSB periodicity may be configured for 5, 10, 20, 40, 80, 160 milliseconds (ms), and etc. However, the UE may or may not measure cell quality with the same periodicity for multiple SSBs. Note that an SSB may refer to a set of SSBs transmitted repeatedly with a particular carrier frequency, periodicity, and SCS. An appropriate periodicity may be configured based on various channel conditions and network conditions, which may reduce unnecessary measurements and/or reduce power consumption of the UE. As such, SSB-based RRM measurement timing configuration (SMTC) window may be used to configure the UE with the periodicity and timing of the SSBs with which the UE may use for measurements. For example, the SMTC window configuration may support the periodicities of 5, 10, 20, 40, 80, and 160 ms and durations of 1, 2, 3, 4, and 5 ms. The SMTC window may also be set with an offset if the SSBs shift. Thus, to measure an SSB or a set of SSBs, an SMTC window may be configured to the UE with SMTC periodicity, SMTC offset, SMTC duration.

In embodiments, if the UE needs to measure SSBs, a measurement map (MG) may be configured to the UE so that the UE may not transmit or receive data, or some other operations while measuring the SSBs. In NR, an MG length (MGL) may be configured with several different values rather than one fixed length for LTE. Thus, a more adequate MGL can be configured for a particular measurement object (MO) to reduce unnecessary degradation of throughput. For example, the MGL for NR may be configurable to 5.5 ms, 4 ms, 3.5 ms, 3 ms, or 1, ms in additional to the original 6 ms. Note that MO refers to an object on which the UE may perform measurements. In intra-frequency and inter-frequency measurements, an MO may indicate a frequency/time location and subcarrier spacing (SCS) of a target reference signal to be measured. Conventionally, only one MG pattern may be configured within one measurement period, if the UE supports per-UE MG only or per-FR MG. when two or more SSBs are transmitted to the UE and need to be measured, the UE may have difficulty to measure both or all of the SSBs at a given time.

Figure 4:
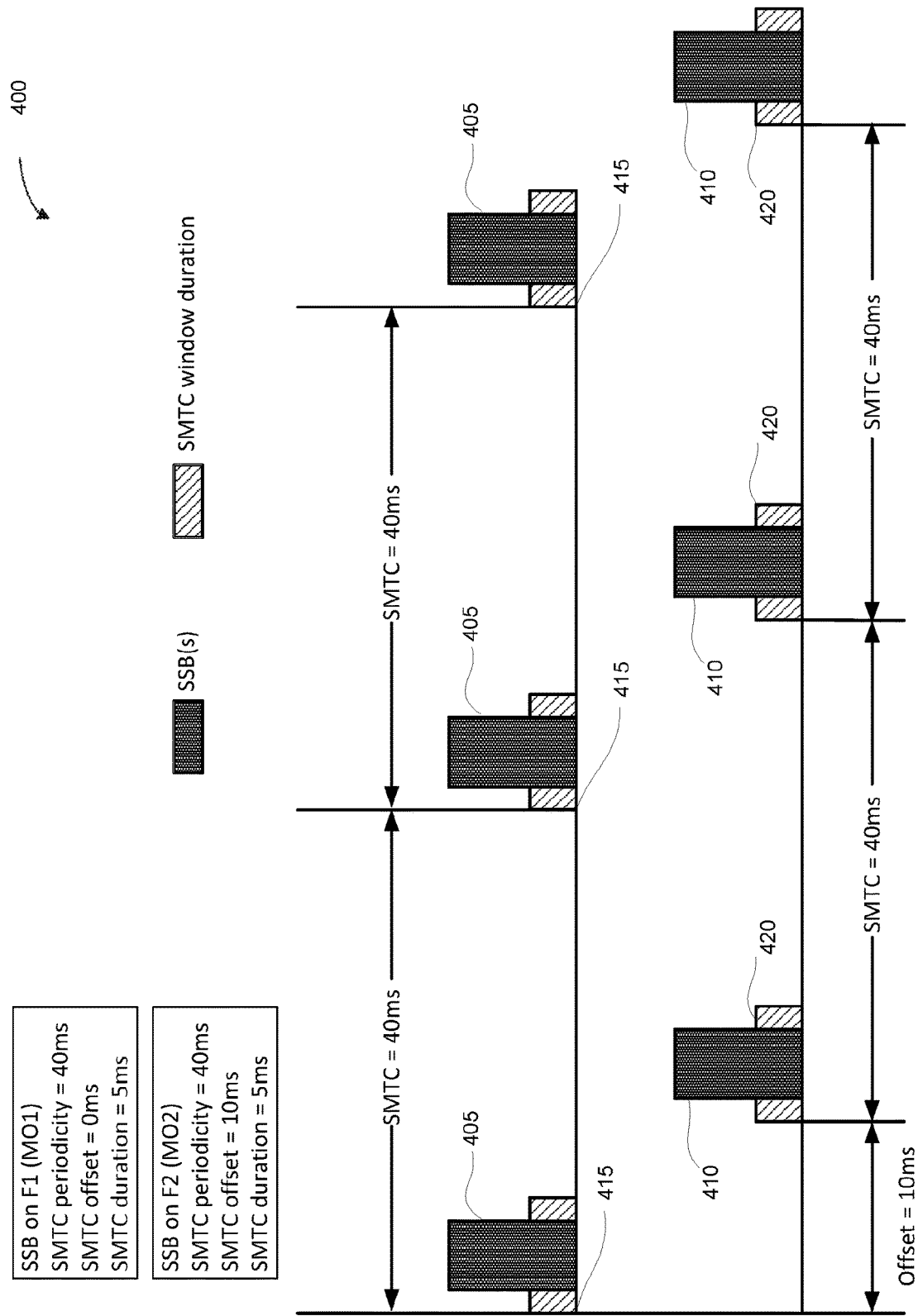
FIG. 4 illustrates an example of more than one measurement object (MO) measurements in an NR involved network, in accordance with various embodiments.

FIG. 4 illustrates an example measurement 400 with more than one measurement object (MO), in accordance with various embodiments. A first set of SSBs 405 and a second set of SSBs 410 may correspond to two MOs (MO1 and MO2) that need to be measured by the UE 105. To perform a measurement in MO1, an SMTC 415 with periodicity of 40 ms, duration of 5 ms, and offset of 0 ms may be configured. To perform a measurement in MO2, an SMTC 420 with periodicity of 40 ms, duration of 5 ms, and offset of 10 ms may be configured. The second SMTC 420 starts 10 ms behind the first SMTC 415. If the UE 105 needs to measure with both the MO1 and MO2 in a given time period and only one MG pattern may be configured to the UE, the UE may not be able to measure with both the MO1 and MO2 in a single measurement period. This is because no single MG pattern can accommodate both the SMTC windows for MO1 and MO2, when the time difference (10 ms in this example) is not divisible by MG repetition period (MGRP). Note that with existing technologies, MGRP for LTE may be 40 ms or 80 ms, and MGRP for NR may be 20 ms, 40 ms, 80 ms, or 160 ms. From a network perspective, this may limit its flexibility to configure more than one MO since the AN may not configure more than one MG pattern for measurements of the MOs, if both the MOs share the same frequency band, or within the same frequency range of FR1 or FR2. If the AN then coordinate to align the sets of SSBs from network perspective so that one MG pattern accommodates corresponding SMTC windows for the more than one MO, this may delay measurements and/or measurement reporting regarding candidate neighbor cell(s). Thus, more than one MG may allow the UE 105 to measure the more than one MO, by configuring more than one MG and/or MG pattern within one measurement period.

Meanwhile, MG density in a measurement gap period may need to be considered so that only necessary MGs are configured to avoid unnecessary timeout for data transfer. Therefore, the network may configure MGs with better efficiency when acknowledging UE capability in this regard, rather than configuring one or more MGs without knowing the capability of supporting multiple MGs from the UE 105. Note that term "multiple MGs" refers to more than one MG throughout this disclosure.

For MG configuration, the UE 105 may notify the AN 110 of its supporting band combination and needed MG in accordance. Based on this information, the AN 110 may determine a MG configuration and MO(s) for the UE 105, and transmit them to the UE 105. In embodiments, the UE 105 may generate a message to indicate its capability of supporting multiple MGs and send the message to the AN 110. The message may also include information of the number of MGs that the UE 105 can support and/or the types of the MGs that the UE 105 can support. Various formats of information may be used to indicate this UE capability. Embodiments herein are illustrated as examples, but not limiting any other formats or ways to indicate this capability of supporting multiple MGs in any possible ways.

In embodiments, the capability of supporting multiple MGs may be indicated in an information element (IE) of measurement and mobility parameters (MeasAndMobParameters), as defined in 3GPP technical specification (TS) 38.306 v15.2.0. (Jun. 20, 2018). MeasAndMobParameters may include an element of supportOfMultiMeasGap to indicate whether the UE can support multiple MGs, as shown in Table 1.

TABLE 1

| Definitions for parameters | Per | M | FDD-TDD DIFF | FR1-FR2 DIFF |
|---|---|---|---|---|
| ssb-AndCSI-RS-RLM<br>Indicates whether the UE can perform radio link monitoring procedure based on measurement of SS/PBCH block and CSI-RS as specified in TS38.213 [11] and 38.133 [5]. | UE | Tbd | No | No |
| ss-SINR-Meas<br>Indicates whether the UE can perform SS-SINR measurement as specified in TS38.215 [13]. This parameter needs FR1 and FR2 differentiation. | UE | No | No | Yes |
| supportedGapPattern<br>Indicates measurement gap pattern(s) optionally supported by the UE. The leading/leftmost bit (bit 0) corresponds to the gap pattern 2, the next bit corresponds to the gap pattern 3, as specified in TS 38.311 [9] and so on. | UE | No | No | No |
| supportOfMultiMeasGap<br>Indicates whether the UE can support multiple measurement gap as specified in TS38.133 [5]. | UE | No | No | No |

In an example, the MeasAndMobParameters IE may indicate this capability of supporting multiple MGs in 3GPP TS 38.331 v15.2.1 (Jun. 21, 2018). The capability may be indicated in "multiMeasGap-r16" in the MeasAndMobParameters IE, as shown as below in bold:
MeasAndMobParameters
The IE MeasAndMobParameters is used to convey UE capabilities related to measurements for radio resource management (RRM), radio link monitoring (RLM), and mobility (e.g. handover).

MeasAndMobParameters information element

```
-- ASN1START
-- TAG-MEASANDMOBPARAMETERS-START
MeasAndMobParameters ::= SEQUENCE {
    measAndMobParametersCommon         MeasAndMobParametersCommon
        OPTIONAL,
    measAndMobParametersXDD-Diff       MeasAndMobParametersXDD-Diff
        OPTIONAL,
    measAndMobParametersFRX-Diff       MeasAndMobParametersFRX-Diff
        OPTIONAL
}
MeasAndMobParametersCommon ::= SEQUENCE {
    supportedGapPattern        BIT STRING (SIZE (22))        OPTIONAL,
    ...,
    [[   eventB-MeasAndReport     ENUMERATED {supported}      OPTIONAL,
```

| MeasAndMobParameters information element |
| --- |
|     handoverFDD-TDD      ENUMERATED {supported}    OPTIONAL,<br>    eutra-CGI-Reporting    ENUMERATED {supported}    OPTIONAL,<br>    nr-CGI-Reporting       ENUMERATED {supported}    OPTIONAL,<br>]]<br>[[   multiMeasGap-r16       ENUMERATED {supported}    OPTIONAL<br>]]<br>} |

In embodiments, the UE 105 may generate and send the message to the AN 110 with information of the number of multiple MGs that the UE supports. The number may be indicated by a range of integers, e.g., from 0 to N, wherein the N may be a maximum configurable multiple MGs that the UE 105 may support. An example of such an indication is illustrated as below in bold. Additionally or alternatively, the possible configurable multiple MGs may be enumerated in a list.

MeasAndMobParameters

The IE MeasAndMobParameters is used to convey UE capabilities related to measurements for radio resource management (RRM), radio link monitoring (RLM), and mobility (e.g. handover).

MGs. The UE 105 may send the message along with other UE capability information, including but not limited to supporting band combinations, needed MG(s), and needs for gap capability information. The AN 110 may be an eNB, ng-eNB, gNB, or like AN as described with respect to FIG. 1.

In embodiments, if the AN 110 is able to know the information of needed MG(s) by the UE 105 regarding the serving band combination and respective MOs, the UE 105 may not need to notify the AN 110 of additional information regarding MGs. The information may be provided to or derived by the AN 110. For example, if the UE 105 provides certain band combinations that it supports, the AN 110 may

```
                              MeasAndMobParameters information element
-- ASN1 START
-- TAG-MEASANDMOBPARAMETERS-START
MeasAndMobParameters ::= SEQUENCE {
    measAndMobParametersCommon           MeasAndMobParametersCommon
    OPTIONAL,
    measAndMobParametersXDD-Diff         MeasAndMobParametersXDD-Diff
    OPTIONAL,
    measAndMobParametersFRX-Diff         MeasAndMobParametersFRX-Diff
    OPTIONAL
}
MeasAndMobParametersCommon ::= SEQUENCE {
    supportedGapPattern         BIT STRING (SIZE (22))        OPTIONAL,
    ...,
    [[  eventB-MeasAndReport    ENUMERATED {supported}        OPTIONAL,
        handoverFDD-TDD         ENUMERATED {supported}        OPTIONAL,
        eutra-CGI-Reporting     ENUMERATED {supported}        OPTIONAL,
        nr-CGI-Reporting        ENUMERATED {supported}        OPTIONAL,
    ]]
    [[  multiMeasGap-r16        ENUMERATED {0,1,2,3,4,5}      OPTIONAL
    ]]
}
```

In embodiments, the UE 105 may tune one or more RF parts based on MG(s) configured to the UE 105. Such RF parts may include, but is not limited to, RF circuitry 155, RFFE 165, and antenna panels 175. Thus, among other reasons described earlier, it is beneficial for the AN 110 to be aware of the MG(s) needed by the UE 105. Such a need of the UE 105 may be derived by the AN 110 based on certain information sent by the UE 105 along with the capability information of supporting multiple MGs and details of the supporting multiple MGs.

Figure 5B:
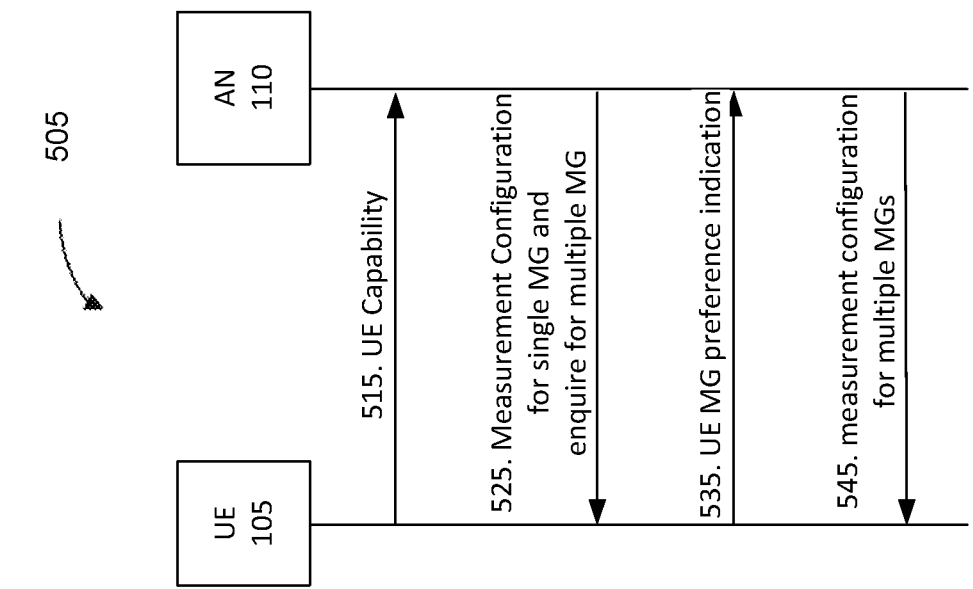
FIGS. 5A and 5B illustrate two example signaling flows of indicating a UE capability of supporting multiple MGs and measurement configuration, in accordance with various embodiments.
Figure 5A:
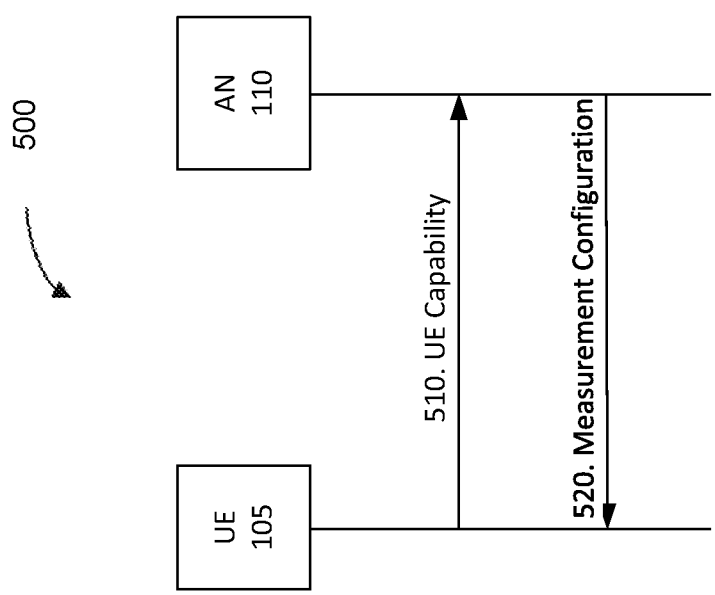

FIG. 5A illustrates an example signaling flow 500 of indicating a UE capability of supporting multiple MGs and measurement configuration, in accordance with various embodiments. The UE 105 may generate and transmit a message to indicate its capability of supporting multiple MGs, to the AN 110, at 510. The message may further include the number of MGs that the UE 105 supports, the enumerated MGs that the UE 105 supports, and/or like information regarding the capability of supporting multiple be able to derive one or more MGs that is needed by the UE when particular MO(s) are to be assigned to the UE by the AN.

In other embodiments, if the AN 110 is not able to know the information of needed MG(s) by the UE 105, there may be several options to under this condition. Some non-limiting example embodiments of options are illustrated as follows.

In embodiments of one option, the UE 105 may generate and transmit a message that includes all serving band combinations and measurement band combinations that are supported by the UE along with needs for one or more MGs in accordance. Such a message may be of a relatively large size depending on the information that the UE may provide.

In embodiments of another option, the AN 110 may notify the UE 105 of a maximum number of MGs that the AN may support. Thus, the UE 105 may determine the number of multiple MGs that it may support in the network with the AN 110, and generate associated capability information accommodating the maximum number of MGs that the AN 110 allows. The notification from the AN 110 to the UE 105 may be via a dedicated signaling (e.g., RRC) or a broadcast signaling (e.g., PBCH).

In embodiments of another option that is in addition to the above option, the AN 110 may notify the UE 105 of a maximum number of MGs that the AN may support and one or more potential measurement bands or band combinations. Thus, the UE 105 may determine the number of multiple MGs that it may support in the network with the AN 110, and generate associated capability information accommodating the maximum number of MGs and available measurement bands or band combinations that the AN 110 allows or supports. In these approaches, the message may be generated with a smaller size due to less amount of information it may provide. Similarly, the notification from the AN 110 to the UE 105 may be via a dedicated signaling (e.g., RRC) or a broadcast signaling (e.g., PBCH).

At 520, once the AN 110 collects the UE capability information, the AN 110 may determine and generate a measurement configuration based on the UE capability information and other network conditions. The measurement configuration may include an MG configuration and an MO configuration. The MG configuration may include one or more MGs configured to the UE 105. The MO configuration may include one or more MOs that are assigned to UE to measure. The MOs may indicate respective frequencies and/or SCSs with respect to the measurements. The AN 110 may transmit the measurement configuration to the UE 105.

FIG. 5B illustrates another example signaling flow 505 of indicating UE capability of supporting multiple MGs and measurement configuration, in accordance with various embodiments. At 515, the UE 105 may generate and transmit a message to indicate its capability of supporting multiple MGs, to the AN 110, at 510. The message may further include the number of MGs that the UE 105 supports, the enumerated MGs that the UE 105 supports, and/or like information regarding the capability of supporting multiple MGs. The message may further include a single MG that is needed by the UE 105. The AN 110 may be an eNB, ng-eNB, gNB, or like AN as described with respect to FIG. 1.

At 525, the AN 110 may generate a first measurement configuration that includes a single MG based on the message sent by the UE. The AN 110 may also enquire the UE 105 regarding the needs for one or more MGs based on serving band information provided by the UE 105 and/or associated MOs. For example, the AN 110 may determine one or more MGs that are potentially needed for certain measurements associated with the MOs and serving band(s)/band combination(s). Then the AN 110 may enquire the UE 105 with respect to the needs of those MGs.

At 535, the UE 105 may respond the enquiry with an MG preference indication that indicates whether the enquired one or more MGs are needed or nor respectively.

At 545, the AN 110 may determine a second measurement configuration based on the MG preference indication sent by the UE 105. This second measurement configuration may include more than one MGs that are to be configured to the UE 105 based on its preference indication.

FIG. 6A illustrates an operation flow/algorithmic structure 600 to facilitate a process of MG configuration with respect to UE capability of supporting multiple MGs by the UE 105 in NR involved networks, in accordance with various embodiments. Note that FIG. 6A describes a MG configuration and/or measurement configuration with respect to a capability of the UE to support multiple MGs that are the same or substantially similar to the procedures described with respect to the FIGS. 5A/5B. The operation flow/algorithmic structure 600 may be performed by the UE 105 or circuitry thereof.

The operation flow/algorithmic structure 600 may include, at 610, generating a message that includes an information element (IE) to indicate a capability of the UE to support multiple MGs. This message may be generated prior to any MG configuration configured and/or transmitted by the AN 110. The message may further include the number of MGs that the UE 105 supports, the enumerated MGs that the UE 105 supports, and/or like information regarding the capability of supporting multiple MGs. For example, The UE 105 may send the message along with other UE capability information, including but not limited to supporting band combinations, needed MG(s), and needs for gap capability information. Further details regarding the message can be found in descriptions with respect to FIGS. 5A/5B.

The operation flow/algorithmic structure 600 may further include, at 620, transmitting the message to an AN. The AN may be the same as or substantially similar to the AN 110 in this disclosure. The transmission of the message may be prior to any MG configuration configured and/or transmitted by the AN 110.

The operation flow/algorithmic structure 600 may further include, at 630, decoding, upon reception of a measurement configuration, one or more MGs configured by the measurement configuration. The one or more MGs may be determined and configured by the AN 110, based on the capability of the UE 105 transmitted to the AN 110. Once the UE 105 decodes the one or more MGs that it may use during a measurement, the UE 105 may measure SSBs or other like measurements with the one or more MGs depending one or more measurement objects scheduled by the AN 110.

In some embodiments, UE 105 may determine or generate its capability information 35 based on a message received from the AN 110. That message may indicate certain information regarding MG configuration. For example, the message by the AN may notify the UE 105 of a maximum number of MGs that the AN may support, and/or potential serving band(s) and band combination(s) that the AN may schedule to use for the UE 105. Such a message may be transmitted via dedicated signaling (e.g., RRC) or broadcasting (e.g., SIB and PBCH).

In some embodiments, the UE 105 determine MG preferences with respect to a plurality of MGs that are enquired by the AN 110. The UE 105 may generate a message to indicate the MG preferences and transmit the message to the AN 110 so that the AN 110 may configure one or more MGs based on UE's preferences to respective MGs.

FIG. 6B illustrates an operation flow/algorithmic structure 605 to facilitate the process of MG configuration with respect to UE capability of supporting multiple MGs by the AN 110 in the NR involved networks, in accordance with various embodiments. Note that FIG. 6B describes a MG configuration and/or measurement configuration with respect to a capability of the UE to support multiple MGs that are the same or substantially similar to the procedures described with respect to the FIGS. 5A/5B. The operation flow/algorithmic structure 605 may be performed by the AN 110 or circuitry thereof.

The operation flow/algorithmic structure 605 may include, at 615, decoding, upon reception of a message that includes an IE from a UE, the IE that indicates a capability of the UE to support multiple MGs. When the UE supports multiple MGs, the AN 110 may schedule multiple MGs with respect to multiple measurement objects (MOs). Further details regarding the multiple MGs are described with respect to FIGS. 5A and 5B.

The operation flow/algorithmic structure 605 may further include, at 625, determining one or more MGs for the UE based on the capability. The AN 110 may determine the one or more MGs based on the capability and additional information, such as potential serving band(s) and/or band combination(s) available to the UE 105 and/or AN 110, and other like information with respect to MG configurations.

The operation flow/algorithmic structure 605 may further include, at 635, transmitting a measurement configuration that includes the one or more MGs to the UE. The measurement configuration may include an MG configuration and additional configurations with respect to synchronization signal (SS) measurements.

In some embodiments, the AN 110 may provide additional information to the UE 105 and determine the one or more MGs further based on the feedback from the UE regarding the additional information. For example, the AN may transmit an additional message to notify the UE 105 of a maximum number of MGs it may support and potential serving band(s) and/or band combination(s) that the AN may support.

In some embodiments, the AN may transmit a first measurement configuration with one MG to the UE, then generate a second measurement configuration after the first measurement configuration. The second measurement configuration may be determined based on a UE preference indication to respect MGs that enquired by the AN 110 to the UE 105. Further details in the regarding procedure are described with respect to FIG. 5B.

Figure 7:
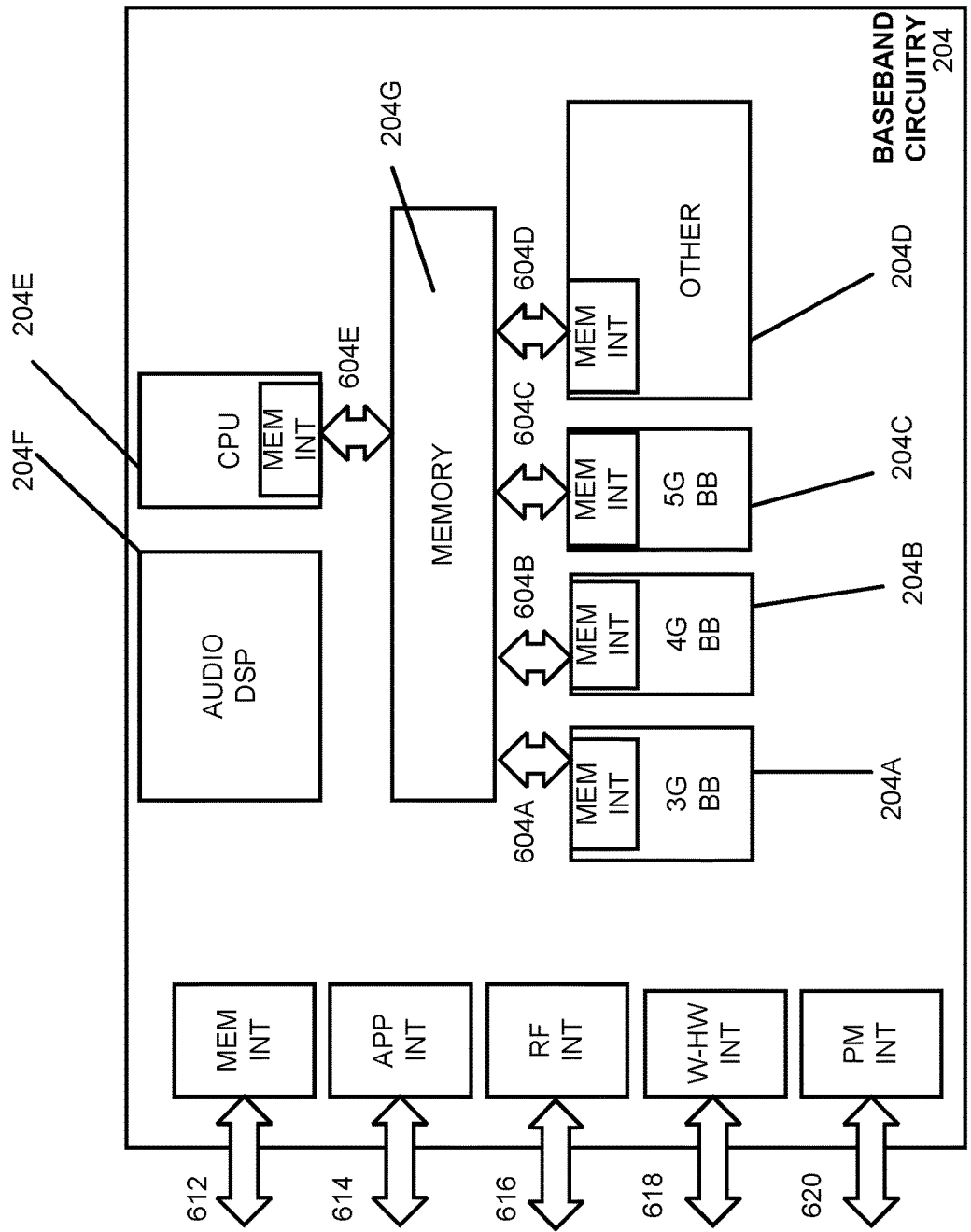
FIG. 7 illustrates example interfaces of baseband circuitry in accordance with some embodiments.

FIG. 7 illustrates example interfaces of baseband circuitry in accordance with some embodiments. As discussed above, the baseband circuitry 204 of FIG. 2 may comprise processors 204A-204E and a memory 204G utilized by said processors. The processors 204A-204E of the UE 105 may perform some or all of the operation flow/algorithmic structure 600, in accordance with various embodiments with respect to FIGS. 5A and 5B. The processors 204A-204E of the AN 110 may perform some or all of the operation flow/algorithmic structure 605, in accordance with various embodiments with respect to FIGS. 5A and 5B. Each of the processors 204A-204E may include a memory interface, 704A-704E, respectively, to send/receive data to/from the memory 204G. The processors 204A-204E of the UE 105 may be used to process the SFTD measurement; the processors 204A-204E of the AN 110 may be used to generate the SFTD measurement configuration.

The baseband circuitry 204 may further include one or more interfaces to communicatively couple to other circuitries/devices, such as a memory interface 712 (e.g., an interface to send/receive data to/from memory external to the baseband circuitry 204), an application circuitry interface 714 (for example, an interface to send/receive data to/from the application circuitry 202 of FIG. 2), an RF circuitry interface 716 (for example, an interface to send/receive data to/from RF circuitry 206 of FIG. 2), a wireless hardware connectivity interface 718 (for example, an interface to send/receive data to/from Near Field Communication (NFC) components, Bluetooth® components (for example, Bluetooth® Low Energy), Wi-Fi® components, and other communication components), and a power management interface 720 (for example, an interface to send/receive power or control signals).

Figure 8:
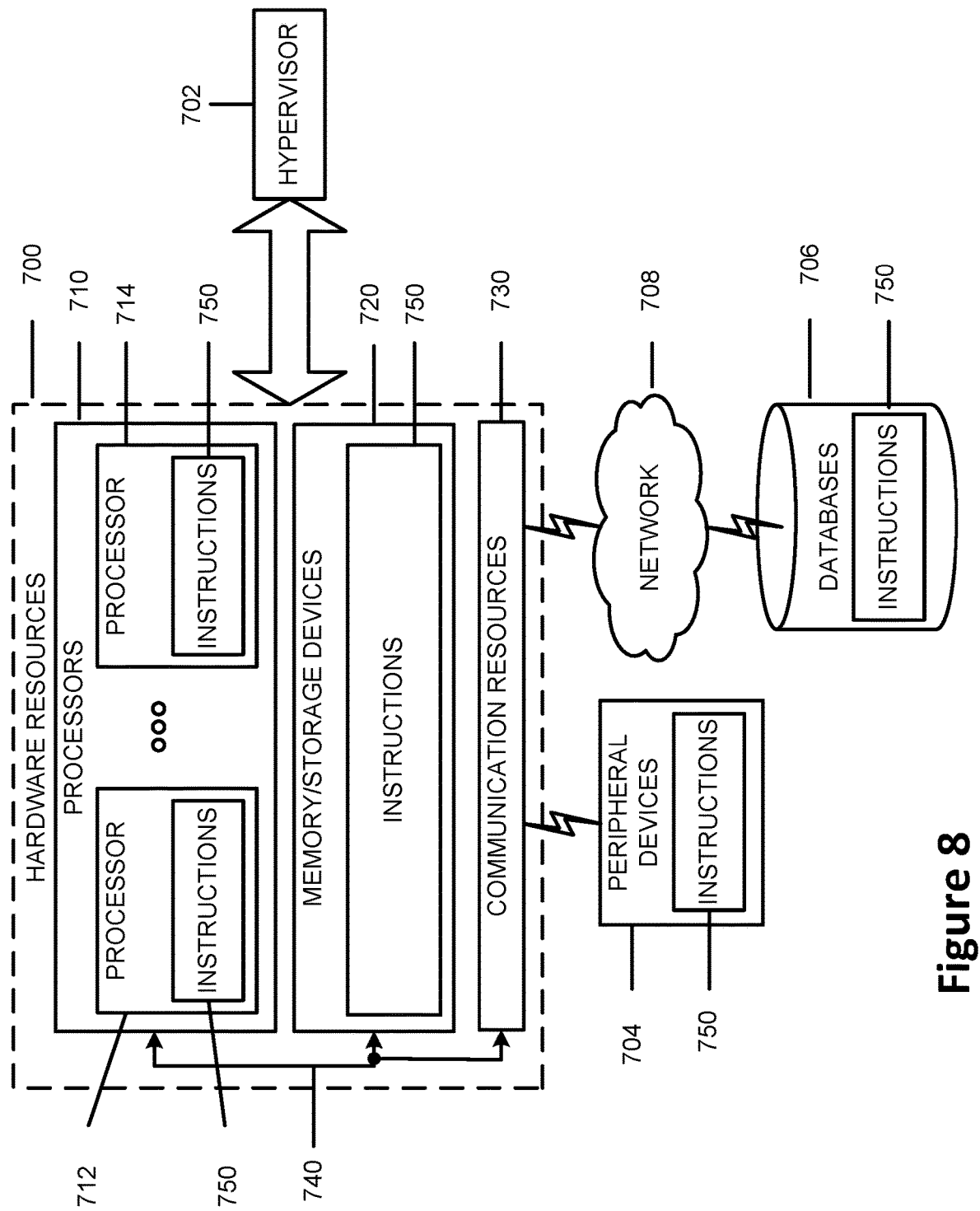
FIG. 8 illustrates hardware resources in accordance with some embodiments.

FIG. 8 is a block diagram illustrating components, according to some example embodiments, able to read instructions from a machine-readable or computer-readable medium (for example, a non-transitory machine-readable storage medium) and perform any one or more of the methodologies discussed herein. Specifically, FIG. 8 shows a diagrammatic representation of hardware resources 800 including one or more processors (or processor cores) 810, one or more memory/storage devices 820, and one or more communication resources 830, each of which may be communicatively coupled via a bus 840. For embodiments where node virtualization (for example, network function virtualization (NFV)) is utilized, a hypervisor 802 may be executed to provide an execution environment for one or more network slices/sub-slices to utilize the hardware resources 800.

The processors 810 (for example, a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 812 and a processor 814.

The memory/storage devices 820 may include main memory, disk storage, or any suitable combination thereof. The memory/storage devices 820 may include, but are not limited to, any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 830 may include interconnection or network interface components or other suitable devices to communicate with one or more peripheral devices 804 or one or more databases 806 via a network 808. For example, the communication resources 830 may include wired communication components (for example, for coupling via a Universal Serial Bus (USB)), cellular communication components, NFC components, Bluetooth® components (for example, Bluetooth® Low Energy), Wi-Fi® components, and other communication components.

Instructions 850 may comprise software, a program, an application, an applet, an app, or other executable code for causing at least any of the processors 810 to perform any one or more of the methodologies discussed herein, e.g., the operation flows 600 and 605. For example, in an embodiment in which the hardware resources 800 are implemented into the UE 105, the instructions 850 may cause the UE to perform some or all of the operation flow/algorithmic structure 600. In other embodiments, the hardware resources 800 may be implemented into the AN 110. The instructions 850 may cause the AN 110 to perform some or all of the operation flow/algorithmic structure 605. The instructions 850 may reside, completely or partially, within at least one of the processors 810 (for example, within the processor's cache memory), the memory/storage devices 820, or any suitable combination thereof. Furthermore, any portion of the instructions 850 may be transferred to the hardware resources 800 from any combination of the peripheral devices 804 or the databases 806. Accordingly, the memory of processors 810, the memory/storage devices 820, the peripheral devices 804, and the databases 806 are examples of computer-readable and machine-readable media.

Some non-limiting Examples of various embodiments are provided below.

Example 1 may include a method comprising: generating or causing to generate a message that includes an information element (IE) to indicate a capability of the UE to support multiple measurement gaps (MGs); and transmitting or causing to transmit the message to an access node (AN).

Example 2 may include the method of example 1 and/or some other examples herein, wherein the IE is a measurement and mobility parameters (MeasAndMobParameters) IE.

Example 3 may include the method of example 1 and/or some other examples herein, wherein the IE is to indicate the capability to support multiple MGs by a number of MGs or a list of the MGs that are supported by the UE.

Example 4 may include the method of example 1 and/or some other examples herein, wherein the IE is to indicate the capability to support the multiple MGs by a range of integers from 0 to N, and wherein the range of integers is to indicate a plurality of MGs supported by the UE and the integer N is to indicate a maximum number of the plurality of MGs supported by the UE.

Example 5 may include the method of example 1 and/or some other examples herein, wherein the capability is further to indicate one or more serving bands or serving band combinations that are supported by the UE.

Example 6 may include the method of example 5 and/or some other examples herein, wherein the capability includes MG capability information that indicates one or more MGs that correspond to individual serving bands or serving band combinations of the one or more serving bands or serving band combinations.

Example 7 may include the method of example 1 and/or some other examples herein, wherein the message is a first message, and the method further comprising decoding or causing to decode, upon reception of a second message from the AN, the second message that indicates a maximum number of MGs supported by the AN; and determining or causing to determine the capability of the UE to support a number of MGs, based on the maximum number of MGs supported by the AN, wherein the number is less than or equal to the maximum number.

Example 8 may include the method of example 7 and/or some other examples herein, wherein the second message is to further indicate one or more target measurement bands by the AN.

Example 9 may include the method of example 8 and/or some other examples herein, further comprising determining or causing to determine the capability of the UE to support the number of MGs, based on the one or more target measurement bands and the maximum number of MGs supported by the AN.

Example 10 may include the method of examples 1-9 and/or some other examples herein, further comprising decoding or causing to decode, upon reception of a measurement configuration from the AN, one or more MGs configured by the measurement configuration based on the capability of the UE; and performing or causing to perform one or more measurements with the one or more MGs.

Example 11 may include the method of examples 1-10 and/or some other examples herein, further comprising decoding or causing to decode, upon reception of a second message from the AN, a measurement configuration that includes a single MG configured by the AN based on an indication of an MG by the UE in the first message and an enquiry with respect to a plurality of MGs that correspond to a plurality of measurement objects (MOs); determining or causing to determine respective MG preferences to the enquiry with respect to the plurality of MGs; generating or causing to generate a third message that indicates the respective MG preferences; and transmitting or causing to transmit the third message to the AN.

Example 12 may include the method of example 11 and/or some other examples herein, further comprising decoding to causing to decode, upon reception of a second measurement configuration from the AN, a plurality of MGs configured by the AN based on the third message.

Example 13 may include the method of examples 1-12 and/or some other examples herein, wherein the method is performed by a UE or a portion thereof.

Example 14 may include a method comprising: decoding or causing to decode, upon reception of a message that includes an information element (IE) from a user equipment (UE), the IE that indicates a capability of the UE to support multiple measurement gaps (MGs); determining or causing to determine one or more MGs for the UE based on the capability; and transmitting or causing to transmit, to the UE, a measurement configuration that includes the one or more MGs.

Example 15 may include the method of example 14 and/or some other examples herein, wherein the message is a first message and, the method further comprising generating or causing to generate a second message that indicates a maximum number of MGs supported by the AN; and transmitting or causing to transmit the second message to the UE via a broadcast message or a dedicated message.

Example 16 may include the method of examples 13-15 and/or some other examples herein, further comprising generating or causing to generate a second message that enquires respective preferences to a plurality of MGs that correspond to a plurality of measurement objects (MOs); and transmitting or causing to transmit the second message to the UE.

Example 17 may include the method of examples 13-16 and/or some other examples herein, further comprising decoding or causing to decode, upon reception of a third message from the UE, the third message that indicates the respective MG preferences to the plurality of MGs; determining or causing to determine one or more of the plurality of MGs for the UE, based on the respective MG preferences to the plurality of MGs; and transmitting or causing to transmit, to the UE, a second measurement configuration that includes the one or more of the plurality of MGs.

Example 18 may include the method of examples 1-17 and/or some other examples herein, wherein the SSB includes a set of SS blocks.

Example 19 may include a method comprising generating or causing to generate an IE of MG configuration (MeasGapConfig) or BWP downlink that is to indicate an activation of an MG based on an active BWP; and transmitting or causing to transmit the IE to a UE via RRC signaling.

Example 20 may include the method of example 19 and/or some other examples herein, wherein to transmit the IE, the method further comprising generating or causing to generate a configuration message that includes the IE of BWP downlink information to indicate the active BWP for the UE; and transmitting or causing to transmit the configuration message to the UE via DCI signaling.

Example 21 may include the method of examples 14-20, and/or some other examples herein, wherein the method is performed by an access node (AN) or a portion thereof.

Example 22 may include an apparatus comprising means to perform one or more elements of the method described in or related to any of examples 1-21, or any other method or process described herein.

Example 23 may include one or more non-transitory computer-readable media comprising instructions to cause an electronic device, upon execution of the instructions by one or more processors of the electronic device, to perform one or more elements of the method described in or related to any of examples 1-21, or any other method or process described herein.

Example 24 may include an apparatus comprising logic, modules, and/or circuitry to perform one or more elements of the method described in or related to any of examples 1-21, or any other method or process described herein.

Example 25 may include a method, technique, or process as described in or related to any of examples 1-21, or portions or parts thereof.

Example 26 may include an apparatus comprising: one or more processors and one or more computer-readable media comprising instructions that, when executed by the one or more processors, cause the one or more processors to perform the method, techniques, or process as described in or related to any of examples 1-21, or portions thereof.

The present disclosure is described with reference to flowchart illustrations or block diagrams of methods, apparatuses (systems) and computer program products according to embodiments of the disclosure. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means that implement the function/act specified in the flowchart or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide processes for implementing the functions/acts specified in the flowchart or block diagram block or blocks.

The description herein of illustrated implementations, including what is described in the Abstract, is not intended to be exhaustive or to limit the present disclosure to the precise forms disclosed. While specific implementations and examples are described herein for illustrative purposes, a variety of alternate or equivalent embodiments or implementations calculated to achieve the same purposes may be made in light of the above detailed description, without departing from the scope of the present disclosure, as those skilled in the relevant art will recognize.

What is claimed is:

1. A non-transitory computer-readable medium (CRM) storing instructions that, when executed by one or more processors of a user equipment (UE), cause the UE to perform operations, wherein the operations comprise:

receiving a first message from a base station (BS);

decoding the first message, wherein the first message indicates a maximum number of measurement gaps (MGs) supported by the BS;

determining a capability of the UE to support multiple MGs, based on the maximum number of MGs supported by the BS, wherein the multiple MGs are less than or equal to the maximum number of MGs supported by the BS;

generating a second message comprising an information element (IE) indicating a capability of the UE to support the multiple MGs, wherein the IE indicates a range of integers from 0 to N, wherein the range of integers indicates the multiple MGs supported by the UE, and wherein N indicates a maximum number of the multiple MGs supported by the UE;

transmitting the second message to a base station (BS);

receiving a third message from the BS, wherein the third message comprises a first measurement configuration including a single MG based on an indication in the second message, and an enquiry with respect to MG preferences for the multiple MGs that correspond to a plurality of measurement objects (MOs);

determining respective MG preferences in response to the enquiry with respect to the multiple MGs; and transmitting to the BS, a fourth message that indicates the respective MG preferences.

2. The non-transitory CRM of claim 1, wherein the IE is a measurement and mobility parameters (MeasAndMobParameters) IE.

3. The non-transitory CRM of claim 1, wherein the IE indicates a number of MGs of the multiple MGs or a list of the MGs of the multiple MGs that are supported by the UE.

4. The non-transitory CRM of claim 1, wherein the IE indicates one or more serving bands or serving band combinations that are supported by the UE.

5. The non-transitory CRM of claim 4, wherein the IE comprises MG capability information that indicates one or more MGs of the multiple MGs that correspond to individual serving bands or serving band combinations of the one or more serving bands or the serving band combinations.

6. The non-transitory CRM of claim 1, wherein the first message further indicates one or more target measurement bands of the BS, and wherein the determining the capability of the UE to support the multiple MGs is based on the one or more target measurement bands and the maximum number of MGs supported by the BS.

7. The non-transitory CRM of claim 1, wherein, the operations further comprise:

decoding the single MG configured by the first measurement configuration, wherein the first measurement configuration is based on the capability of the UE; and performing a measurement with the single MG.

8. The non-transitory CRM of claim 1, wherein the operations further comprise:

receiving, from the BS, a second measurement configuration comprising one or more MGs of the multiple MGs, wherein the second measurement configuration is based on the respective MG preferences; and decoding the one or more MGs of the multiple of MGs.

9. The non-transitory CRM of claim 1, wherein the respective MG preferences indicate whether the UE supports each MG of the multiple MGs enquired by the third message.

10. A non-transitory computer-readable medium (CRM) storing instructions that, when executed by one or more processors of a base station (BS), cause the BS to perform operations, wherein the operations comprise:
   generating a first message that indicates a maximum number of measurement gaps (MGs) supported by the BS;
   transmitting the first message to a user equipment (UE) via a broadcast message or a dedicated message;
   receiving a second message that includes an information element (IE) from the UE;
   decoding the IE, wherein the IE indicates a capability of the UE to support multiple MGs, wherein the IE indicates a range of integers from 0 to N, wherein the range of integers indicates the multiple MGs supported by the UE, and wherein N indicates a maximum number of the multiple MGs supported by the UE;
   determining a single MG for the UE based on the second message;
   transmitting, to the UE, a third message comprising a first measurement configuration comprising the single MG, and an enquiry regarding MG preferences for the multiple MGs that correspond to a plurality of measurement objects (MOs); and
   receiving a fourth message from the UE comprising respective MG preferences of the multiple MGs.

11. The non-transitory CRM of claim 10, wherein the third message further indicates one or more target measurement bands for UE measurements.

12. The non-transitory CRM of claim 10, wherein the operations further comprise:
   determining one or more MGs of the multiple of MGs for the UE, based on the respective MG preferences of the multiple MGs; and
   transmitting, to the UE, a second measurement configuration that includes the one or more MGs of the multiple MGs.

13. A user equipment (UE), comprising:
a memory; and
one or more processors communicatively coupled to the memory, wherein the one or more processors are configured to:
   receive a first message from a base station (BS);
   decode the first message, wherein the first message indicates a maximum number of measurement gaps (MGs) supported by the BS;
   determine a capability of the UE to support multiple MGs, based on the maximum number of MGs supported by the BS, wherein the multiple MGs are less than or equal to the maximum number of MGs supported by the BS;
   generate a measurement and mobility parameters (MeasAndMobParameters) information element (IE) indicating a capability of the UE to support the multiple MGs, wherein the IE indicates a range of integers from 0 to N, wherein the range of integers indicates the multiple MGs supported by the UE, and wherein N indicates a maximum number of the multiple MGs supported by the UE;
   generate a second message that includes the IE;
   transmit the second message to the BS;
   receive a third message from the BS, wherein the third message comprises a first measurement configuration including a single MG based on an indication in the second message, and an enquiry with respect to MG preferences for the multiple MGs that correspond to a plurality of measurement objects (MOs);
   determine respective MG preferences in response to the enquiry with respect to the multiple MGs; and
   transmit to the BS, a fourth message that indicates the respective MG preferences.

14. The UE of claim 13, wherein the MeasAndMobParameters IE further indicates a number of MGs of the multiple MGs or a list of enumerated MGs of the multiple MGs that are supported by the UE with respect to the capability.

15. The UE of claim 13, wherein the MeasAndMobParameters IE further indicates one or more serving bands or serving band combinations that are supported by the UE.

16. The UE of claim 13, wherein the first message further indicates one or more target measurement bands of the BS, and wherein the determining the capability of the UE to support the multiple MGs is based on the one or more target measurement bands and the maximum number of MGs supported by the BS.

17. The UE of claim 13, wherein the IE indicates a number of MGs of the multiple MGs or a list of the MGs of the multiple MGs that are supported by the UE.

18. The UE of claim 13, wherein, the one or more processors are further configured to:
   decode the single MG configured by the first measurement configuration, wherein the first measurement configuration is based on the capability of the UE; and
   perform a measurement with the single MG.

19. The UE of claim 13, wherein the one or more processors are further configured to:
   receive, from the BS, a second measurement configuration comprising one or more MGs of the multiple MGs, wherein the second measurement configuration is based on the respective MG preferences; and
   decode the one or more MGs of the multiple MGs.

20. The UE of claim 13, wherein the respective MG preferences indicate whether the UE supports each MG of the multiple MGs enquired by the third message.

* * * * *